(12) United States Patent
Wu et al.

(10) Patent No.: US 11,971,574 B2
(45) Date of Patent: Apr. 30, 2024

(54) MULTI-MODE DEVICES FOR MULTIPLEXING AND DE-MULTIPLEXING

(71) Applicant: Apple Inc., Cupertino, CA (US)

(72) Inventors: Yi-Kuei Wu, San Jose, CA (US); Lucia Gan, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/725,418

(22) Filed: Apr. 20, 2022

(65) Prior Publication Data
US 2023/0110382 A1    Apr. 13, 2023

Related U.S. Application Data

(60) Provisional application No. 63/248,211, filed on Sep. 24, 2021.

(51) Int. Cl.
*G02B 6/12*    (2006.01)
*G02B 6/122*   (2006.01)
*G02B 6/293*   (2006.01)

(52) U.S. Cl.
CPC ....... *G02B 6/12007* (2013.01); *G02B 6/1228* (2013.01); *G02B 6/29344* (2013.01); *G02B 6/2938* (2013.01)

(58) Field of Classification Search
CPC .......... G02B 6/2813; G02B 6/12007; G02B 6/1228; G02B 6/29334; G02B 6/2938
See application file for complete search history.

(56) References Cited

U.S. PATENT DOCUMENTS 4,934,775 A   6/1990  Koai
5,524,156 A   6/1996  Van Der Tol
(Continued)

FOREIGN PATENT DOCUMENTS

CN    109445026    12/2020
JP    H04204508    7/1992
(Continued)

OTHER PUBLICATIONS

He et al., "Integrated Polarization Compensator for WDM Waveguide Demultiplexers," *IEEE Photonics Technology Letters* vol. 11, No. 2, Feb. 1999, pp. 224-226.
(Continued)

*Primary Examiner* — Michelle R Connelly
*Assistant Examiner* — Mary A El-Shammaa
(74) *Attorney, Agent, or Firm* — Brownstein Hyatt Farber Schreck, LLP (57) ABSTRACT

Configurations for an interferometric device used for multiplexing and de-multiplexing light are disclosed. The interferometric device may include a first input waveguide, a second input waveguide, an interferometric waveguide, and an output waveguide. A fundamental mode of light may be launched into the first and second input waveguides, and the interferometric waveguide may receive the fundamental mode and generate a higher order mode of light, where the two modes of light may be superimposed while propagating through the interferometric waveguide. The two modes of light may be received at an output waveguide that collapses the two modes into a single mode. The light propagating through the interferometric device may be used for increasing optical power even though the wavelengths of light may be different from one another. Additionally, the interferometric device may reduce coherent noise.

12 Claims, 7 Drawing Sheets

(56) References Cited

U.S. PATENT DOCUMENTS

| | | | |
|---|---|---|---|
| 5,544,268 A | 8/1996 | Bischel | |
| 5,586,206 A | 12/1996 | Brinkman | |
| 5,647,036 A | 7/1997 | Deacon | |
| 5,652,817 A | 7/1997 | Brinkman | |
| 5,664,032 A | 9/1997 | Bischel | |
| 5,718,989 A * | 2/1998 | Aoki | C01G 53/42 |
| | | | 429/223 |
| 5,724,463 A | 3/1998 | Deacon | |
| 5,790,720 A | 8/1998 | Marcuse | |
| 5,818,989 A | 10/1998 | Nakamura | |
| 5,835,458 A | 11/1998 | Bischel | |
| 5,911,018 A | 6/1999 | Bischel | |
| 5,912,997 A | 6/1999 | Bischel | |
| 5,978,524 A | 11/1999 | Bischel | |
| 6,014,390 A | 1/2000 | Joyner | |
| 6,078,704 A | 6/2000 | Bischel | |
| 6,118,908 A | 9/2000 | Bischel | |
| 6,141,465 A | 10/2000 | Bischel | |
| 6,167,169 A | 12/2000 | Brinkman | |
| 6,393,185 B1 | 5/2002 | Deacon | |
| 6,415,080 B1 | 7/2002 | Sappey et al. | |
| 6,522,794 B1 | 2/2003 | Bischel | |
| 6,643,432 B2 | 11/2003 | Bouda | |
| 6,674,949 B2 | 1/2004 | Allan et al. | |
| 6,842,545 B2 | 1/2005 | Lackritz et al. | |
| 6,882,758 B2 | 4/2005 | Betty | |
| 6,903,820 B2 | 6/2005 | Wang | |
| 6,934,447 B2 | 8/2005 | Kim | |
| 6,954,568 B2 | 10/2005 | Liu | |
| 7,016,568 B2 | 3/2006 | Van Weerden et al. | |
| 7,031,568 B2 | 4/2006 | Laming et al. | |
| 7,103,247 B2 | 9/2006 | Yamazaki et al. | |
| 7,149,387 B2 | 12/2006 | Balakrishnan et al. | |
| 7,151,635 B2 | 12/2006 | Bidnyk et al. | |
| 7,263,394 B2 | 8/2007 | Wang | |
| 7,324,195 B2 | 1/2008 | Packirisamy et al. | |
| 7,327,918 B2 | 2/2008 | Yamazaki et al. | |
| 7,366,421 B2 | 4/2008 | Cho et al. | |
| 7,421,167 B2 | 9/2008 | Charters et al. | |
| 7,595,879 B2 | 9/2009 | Wang | |
| 7,831,298 B1 | 11/2010 | Wang | |
| 7,840,108 B2 * | 11/2010 | Miyadera | G02B 6/2813 |
| | | | 385/45 |
| 7,876,983 B2 | 1/2011 | Doerr | |
| 7,970,458 B2 | 6/2011 | Norris et al. | |
| 7,974,504 B2 | 7/2011 | Nagarajan et al. | |
| 7,999,938 B2 | 8/2011 | Wang | |
| 8,411,260 B1 | 4/2013 | Feng | |
| 8,498,681 B2 | 7/2013 | Wang et al. | |
| 9,052,447 B2 | 6/2015 | Luo et al. | |
| 9,176,282 B2 | 11/2015 | Pottier | |
| 9,395,494 B2 | 7/2016 | Krishnamurthi et al. | |
| 9,678,012 B2 | 6/2017 | Rothberg et al. | |
| 9,759,865 B1 | 9/2017 | Lin | |
| 9,784,679 B2 | 10/2017 | Rothberg et al. | |
| 9,817,296 B2 | 11/2017 | Sharkawy et al. | |
| 9,869,816 B2 | 1/2018 | Ishikura et al. | |
| 9,880,352 B2 | 1/2018 | Florjanczyk et al. | |
| 10,126,498 B1 | 11/2018 | Marcuse | |
| 10,359,571 B2 | 7/2019 | Horth | |
| 10,520,672 B2 | 12/2019 | Ma et al. | |
| 10,551,567 B2 | 2/2020 | Wang et al. | |
| 10,578,806 B2 | 3/2020 | Lamponi et al. | |
| 10,901,148 B2 | 1/2021 | Ma et al. | |
| 10,935,726 B1 * | 3/2021 | Lee | G02F 1/3136 |
| 10,976,489 B2 | 4/2021 | Jou et al. | |
| 11,022,522 B2 | 6/2021 | Piazza et al. | |
| 11,079,542 B2 | 8/2021 | Fertig et al. | |
| 11,079,547 B2 | 8/2021 | Trita | |
| 11,131,809 B2 | 9/2021 | Villafranca Velasco | |
| 11,231,319 B1 | 1/2022 | Tu et al. | |
| 11,280,960 B2 | 3/2022 | Qi et al. | |
| 11,320,720 B2 | 5/2022 | Puckett et al. | |
| 11,480,731 B2 | 10/2022 | Liu et al. | |
| 11,500,154 B1 | 11/2022 | Tu et al. | |
| 11,506,535 B1 | 11/2022 | Tu et al. | |
| 11,630,262 B2 | 4/2023 | Shin et al. | |
| 11,644,619 B2 | 5/2023 | Qi et al. | |
| 2003/0091265 A1 | 5/2003 | Lin et al. | |
| 2003/0133663 A1 | 7/2003 | Orignac et al. | |
| 2008/0266639 A1 | 10/2008 | Melloni et al. | |
| 2012/0002924 A1 | 1/2012 | Okayama | |
| 2015/0104130 A1 | 4/2015 | Anderson et al. | |
| 2017/0131471 A1 * | 5/2017 | Ishikura | G02B 6/1228 |
| 2019/0052063 A1 | 2/2019 | Tolstikhin | |
| 2021/0191039 A1 | 6/2021 | Jou et al. | |
| 2021/0270699 A1 | 9/2021 | Piazza et al. | |
| 2022/0091338 A1 | 3/2022 | Tu et al. | |
| 2022/0099889 A1 | 3/2022 | Arbore et al. | |
| 2023/0071329 A1 | 3/2023 | Wu et al. | |
| 2023/0094833 A1 | 3/2023 | Wu | |
| 2023/0125733 A1 | 4/2023 | Thomas et al. | |
| 2023/0358964 A1 | 11/2023 | Dezfouli et al. | |

FOREIGN PATENT DOCUMENTS

| | | |
|---|---|---|
| JP | H063709 | 1/1994 |
| JP | 2006284791 | 10/2006 |
| JP | 2007279240 | 10/2007 |
| JP | 2010223991 | 10/2010 |
| JP | 2011232674 | 11/2011 |
| JP | 2015152729 | 8/2015 |
| JP | 2015197664 | 11/2015 |
| JP | 2016148810 | 8/2016 |
| JP | 2018004692 | 1/2018 |
| WO | WO 05/022223 | 11/2007 |

OTHER PUBLICATIONS

Krubhakar et al., "Design and fabrication of integrated optical 1×8 power splitter in SOI substrate using large cross-section single-mode waveguides," Photonics 2010: Tenth International Conference on Fiber Optics and Photonics, Proceeding of SPIE, Bellingham, Washington, vol. 8173, No. 1, Dec. 29, 2010, pp. 1-6.

U.S. Appl. No. 17/832,091, filed Jun. 3, 2022, Wu.

U.S. Appl. No. 17/851,252, filed Jun. 28, 2022, Wu.

U.S. Appl. No. 17/903,875, filed Sep. 6, 2022, Pelc et al.

U.S. Appl. No. 17/985,615, filed Nov. 11, 2022, Wu et al.

Dai et al., "10-Channel Mode (de)multiplexer with Dual Polarizations," *Laser & Photonics Reviews*, vol. 12, No. 1, Nov. 17, 2017, 9 pages.

Liu et al., "Silicon Multimode Waveguide Grating Filter at 2 um," *Journal of Lightwave Technology*, IEEE USA, vol. 37, No. 10, May 15, 2019, pp. 2217-2222.

Dai et al., "Compact silicon-on-insulator-based multimode interference coupler with bilevel taper structure," Applied Optics, Optical Society of America, vol. 44, No. 24, 2005, pp. 5036-5041.

Li et al., "Compact and low-loss silicon power splitter based on inverse tapers," Optics Letters, Optical Society of America, vol. 38, No. 20, 2013, pp. 4220-4223.

Rasigade et al., "Compact wavelength-insensitive fabrication-tolerant silicon-on-insulator beam splitter," Optics Letters, Optical Society of America, vol. 35, No. 21, 2010, pp. 3700-370.

\* cited by examiner

MULTI-MODE DEVICES FOR MULTIPLEXING AND DE-MULTIPLEXING

CROSS-REFERENCE TO RELATED APPLICATIONS

This application claims the benefit under 35 U.S.C. § 119(e) of U.S. Provisional Patent Application No. 63/248,211, filed Sep. 24, 2021, the contents of which are incorporated herein by reference in their entirety.

FIELD

This disclosure relates generally to an optical system that couples light. More particularly, embodiments herein relate to an optical system with waveguides that may combine or split light.

BACKGROUND

Generally, optical systems (such as photonics integrated circuits) may employ multiple light sources to accomplish certain tasks, such as measuring various types of information. The light sources of these optical systems may emit light at different wavelengths, and it may be desirable to multiplex and/or demultiplex this light at various points within the optical system. Space may be at a premium in optical systems, especially in instances where the optical system is being incorporated into a device with limited available space. Accordingly, it may be desirable to find components that may combine or split light while maintaining a small overall footprint.

SUMMARY

Embodiments of the systems, devices, methods, and apparatuses described in the present disclosure are directed to an interferometric device used for light combining or light splitting.

The present disclosure describes an interferometric device for combining light from a first light source and a second light source. The interferometric device may include a first input waveguide configured to receive input light from the first light source, a second input waveguide configured to receive input light from the second light source, the second input waveguide physically separated from the first input waveguide by a gap, an interferometric waveguide configured to combine the light from the first input waveguide and the second input waveguide, and an output waveguide physically connected to the interferometric waveguide. One of the first input waveguide or the interferometric waveguide may include a tapered section and a straight section abutting the tapered section, and the tapered section combines the light from the first light source and the second light source.

The present disclosure describes a multiplexing device. The multiplexing device may include a first input waveguide configured to receive a first wavelength of a single mode of light and a second input waveguide optically coupled to the first input waveguide and configured to receive a second wavelength of the single mode of light and convert the second wavelength of the single mode of light to a higher order mode of light. The multiplexing device also may include an interferometric waveguide optically coupled to the first input waveguide and configured to receive the single mode of light and the higher order mode of light from the first input waveguide. Additionally, the multiplexing device may include an output waveguide optically coupled to the interferometric waveguide and configured to convert the higher order mode of light received from the interferometric waveguide to the single mode of light and output a combined first and second wavelength single mode of light, thereby mitigating coherent noise.

Additionally, the present disclosure describes a method for de-multiplexing light. The method may include receiving, by an input waveguide, a first wavelength of a first single mode of light and a second wavelength of a second single mode of light, receiving, by an interferometric waveguide, the first and second wavelengths of the first and second single modes of light from the input waveguide, generating, by the interferometric waveguide, a second order mode of light, converting the second order mode of light into a third single mode of light, outputting, by a first output waveguide, the first wavelength of the third single mode of light, and outputting, by a second output waveguide, a second wavelength of the third single mode of light.

Further, the present disclosure describes a light combining device. The light combining device may include a first input waveguide configured to receive a first wavelength of a single mode of light, a second input waveguide configured to receive a second wavelength of the single mode of light, an interferometric waveguide optically coupled to the first input waveguide and the second input waveguide and configured to convert the first and second wavelengths of the single mode of light received from the first and second input waveguides into at least two different order modes of light, and an output waveguide optically coupled to the interferometric waveguide and configured to convert the at least two different order modes of light to a third single mode of light and output the third single mode of light with a combined first and second wavelength of light, thereby doubling an optical output power of light.

In addition to the example aspects and embodiments described above, further aspects and embodiments will become apparent by reference to the drawings and by study of the following description.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

It should be understood that the proportions and dimensions (either relative or absolute) of the various features and elements (and collections and groupings thereof) and the boundaries, separations, and positional relationships presented between them, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

In the following description of examples, reference is made to the accompanying drawings which show, by way of illustration, specific examples that can be practiced. It is to be understood that other examples can be used and structural changes can be made without departing from the scope of the various examples.

Described here are interferometric devices that may be used to split or combine two or more different wavelengths of light. The design of the interferometric device may be tailored to the specific wavelengths, and may represent a compact option for combining or splitting the two wavelengths. The interferometric devices described here are generally used in optical systems that employ a plurality of light sources. In these optical systems it may be desirable to consolidate light from multiple light sources into a common waveguide (e.g., for ease of routing within the optical system, for routing the light to a common output, or the like) or split off one wavelength from another (e.g., for monitoring and controlling the wavelength and/or power provided by a given light source or light sources), and accordingly the system may comprise one or more light splitting devices and/or one or more light combining devices. Indeed, as the number of light sources in the optical system increases, the number, size and/or complexity of the light splitting and light combining devices may also increase.

The interferometric devices described here have particular utility in combining or splitting two or more wavelengths that are close to each other, and may accomplish this with a relatively small form factor. For example, in some instances an optical system may be designed to include two light sources that are configured to emit the same target wavelength (e.g., to provide a redundant light source in case one light source fails and/or to increase the overall power generated by the optical system at that wavelength). In some instances these optical systems can tolerate some deviations from the target wavelength and still obtain a measurement that is effectively the same as if it were taken using the target wavelength (the exact threshold for this will be set based on the overall accuracy requirements of the optical system, which will in turn depend on the overall optical system design as well as its intended use). In these instances, it may be desirable to intentionally select two light sources that emit light with different wavelengths, but such that the difference in the wavelengths is within the acceptable deviation tolerances. The interferometric devices described here may be able to combine these different wavelengths, and may do so with a smaller footprint than what may be achievable by multiplexers that combine inputs with identical wavelengths.

For example, the optical system may be designed to take a measurement using a first target wavelength of light (e.g., generate the first target wavelength using one or more light sources, emit the first target wavelength of light from the optical system and measure the amount of the first target wavelength that is returned to the optical system). The optical system may have a deviation tolerance that represents acceptable deviations from the target wavelength at which the optical system may still make an equivalent measurement. In other words, the optical system may treat light of any wavelength within the deviation tolerance as if it were actually generated at the target wavelength. If the tolerance is, by way of a non-limiting example, two nanometers on either side of the target wavelength, the optical system may comprise two light sources configured to emit light at two different wavelengths within this range (e.g., that may be separated by less than four nanometers), and an interferometric device as described here may be used to combine these wavelengths. As mentioned above, this may increase the power emitted within acceptable bounds of a target wavelength (and/or provide redundancy in case one light source fails) and do so with a smaller footprint.

In some instances, it may be desirable to emit wavelengths that are intentionally spaced slightly apart by a handful of nanometers, as taking measurements with each of these wavelengths may collectively reduce the impact of coherent noise in a given system. For example, in some variations it may be desirable to have at least a three nanometer separation between the wavelengths emitted by the light sources. By combining them using an interferometric device as described here, these wavelengths can be routed together within the system and thereby reduce the number of unique waveguides needed to carry the two wavelengths. Additionally, these interferometric devices may be less sensitive to variations in the manufacturing process than other coupling devices, such as a Mach-Zehnder Interferometer.

In general, the interferometric device typically comprises at least one input that is connected to at least one output by an interferometric waveguide. In variations where the interferometric device is configured to de-multiplex an input with multiple wavelengths of light, the interferometric device includes an input waveguide, an interferometric waveguide, and two or more output waveguides. In other instances the interferometric device may be configured to multiplex light, in which case the interferometric device may include two or more input waveguides, an interferometric waveguide, and a single output. As described herein, it may be understood that the basic functionality of the interferometric waveguide and light mode coupling that occurs in the interferometric device may be similar whether the interferometric device is splitting light or combining light. That is, the light modes may still similarly couple from one waveguide to another and the optical modes may be generated in a similar manner.

As used throughout this specification, a reference number without an alpha character following the reference number can refer to one or more of the corresponding references, the group of all references, or some of the references. For example, "205" can refer to any one of the input waveguides 205 (e.g., input waveguide 205a, input waveguide 205b, etc.), can refer to all of the input waveguides 205, or can refer to some of the input waveguides (e.g., one of the input waveguides 205a) depending on the context in which it is used.

Representative applications of methods and apparatuses according to the present disclosure are described in this section. These examples are being provided solely to add context and aid in the understanding of the described examples. It will thus be apparent to one skilled in the art that the described examples may be practiced without some or all of the specific details. Other applications are possible, such that the following examples should not be taken as limiting.

These and other embodiments are discussed below with reference to FIGS. 1-5B. However, those skilled in the art will readily appreciate that the detailed description given herein with respect to these Figures is for explanatory purposes only and should not be construed as limiting.

Figure 1:
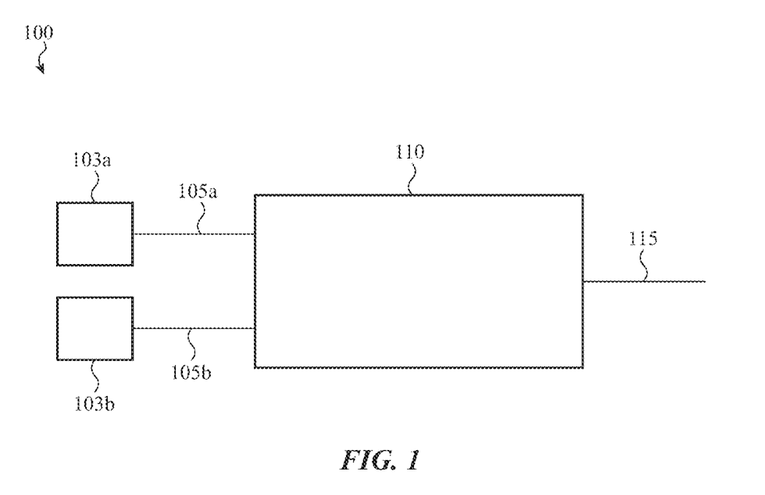
FIG. 1 shows a block diagram of an example interferometric device.

FIG. 1 illustrates a block diagram of an example interferometric device 100 that may be used in an optical system comprising a first light source 103a and a second light source 103b. As shown there, the interferometric device 100 comprises a first input waveguide 105a, a second input waveguide 105b, an interferometric waveguide section 110, and an output waveguide 115. As will be described herein, the interferometric waveguide section 110 may include one or more interferometric waveguides and may be made up of one or more sections each having a different shape, such as a straight section, a tapered section, and/or a mode separating section. The interferometric device 100 may combine light of two different wavelengths with low optical loss, and when these wavelengths are separated by a handful of nanometers (e.g., three nanometers or less apart, as may be dictated by the acceptable deviation tolerances discussed above), the optical system may utilize this combined light as if it were generated by a single light source with increased optical power (e.g., double the optical power) at a target wavelength. Additionally, because the underlying input wavelengths are different, coherent noise associated with measurements taken using each input wavelength may also be different, and this difference may be used to mitigate the impact of coherent noise from the resulting measurement signal.

The input waveguides 105a, 105b may receive light from light sources via light paths that carry the light from the light sources to the input waveguides 105a, 105b. Generally, light paths may be waveguides, optical fibers, free space optics, other elements that may pass light, combinations thereof, and the like. In other words, although the interferometric device 100 may be implemented in a photonics integrated circuit, the first and second light sources 103a, 103b need not be directly integrated into the same photonics integrated circuit so long as light from these light sources may be optically coupled into the photonics integrated circuit to reach the input waveguides 105a, 105b. For the purpose of this application, the first and second light sources 103a, 103b represent the light that reaches the first and second input waveguides 105a, 105b, respectively, and are agnostic with respect to the actual design of the components that generate, route, or otherwise change the light before it reaches the first and second input waveguides 105a, 105b. That said, the optical system may be preferably configured such that the light received by each of the input waveguides 105a, 105b is a fundamental mode of light. It should also be appreciated that although the interferometric devices may be specifically designed to multiplex or de-multiplex light of two predetermined wavelengths, in operation an optical system may at times provide light to the interferometric device at one or more wavelengths other than the predetermined wavelengths. In these instances, the interferometric device may still partially multiplex or de-multiplex light, but will likely do so with larger losses or uneven distribution between outputs depending on the wavelengths provided by the optical system. While two input waveguides 105a, 105b and two light sources 103a, 103b are shown in FIG. 1, some embodiments of interferometric devices described herein include three or more waveguides that receive light from three or more light sources (such as described with respect to FIGS. 5A and 5B).

As mentioned above, the input waveguides 105a, 105b preferably propagate light with a fundamental mode to the interferometric waveguide section 110. For each of the input waveguides 105a, 105b, the interferometric waveguide section 110 may receive the light with the fundamental mode (e.g., TE00) and convert a portion of the fundamental mode of light to a higher order mode of light (e.g., TE10). Converting the mode of light may be achieved in various ways as will be described herein with reference to FIGS. 2A-4B. The interferometric waveguide section 110 converts the higher order mode of light back to the fundamental mode at an output of the interferometric waveguide section 110 (i.e., at output waveguide 115), such that interferometric device 100 receives and outputs light at a fundamental mode. Because the fundamental mode and the higher order mode have different refractive indices within the interferometric waveguide section 110, the modes will interfere with each other while traveling in the interferometric waveguide section 110.

The relative amount of input light provided to an input waveguide that will reach the output waveguide 115 is dependent on the dimensions of the interferometric waveguide section 110, the relative placements of the input and output waveguides relative to the interferometric waveguide section 110, as well as the wavelength of light received by the input waveguide. Accordingly, the interferometric waveguide section 110 may be configured to maximize transmission of a target wavelength between a given input waveguide 105a or 105b and the output waveguide 115. In instances where the interferometric waveguide section 110 simultaneously receives light from both input waveguides 105a, 105b (e.g., a first wavelength from the first input waveguide 105a and a second wavelength from the second input waveguide 105b), the interferometric waveguide section 110 will carry both a fundamental and a higher order mode for the first wavelength and a fundamental and a higher order mode for the second wavelength. The interferometric waveguide section 110 may be configured to maximize transmission of a first target wavelength between the first input waveguide 105a and the output waveguide 115, and further configured to maximize transmission of a second target wavelength between the second input waveguide 105b and the output waveguide 115, as will be discussed in more detail below.

Figure 2A:
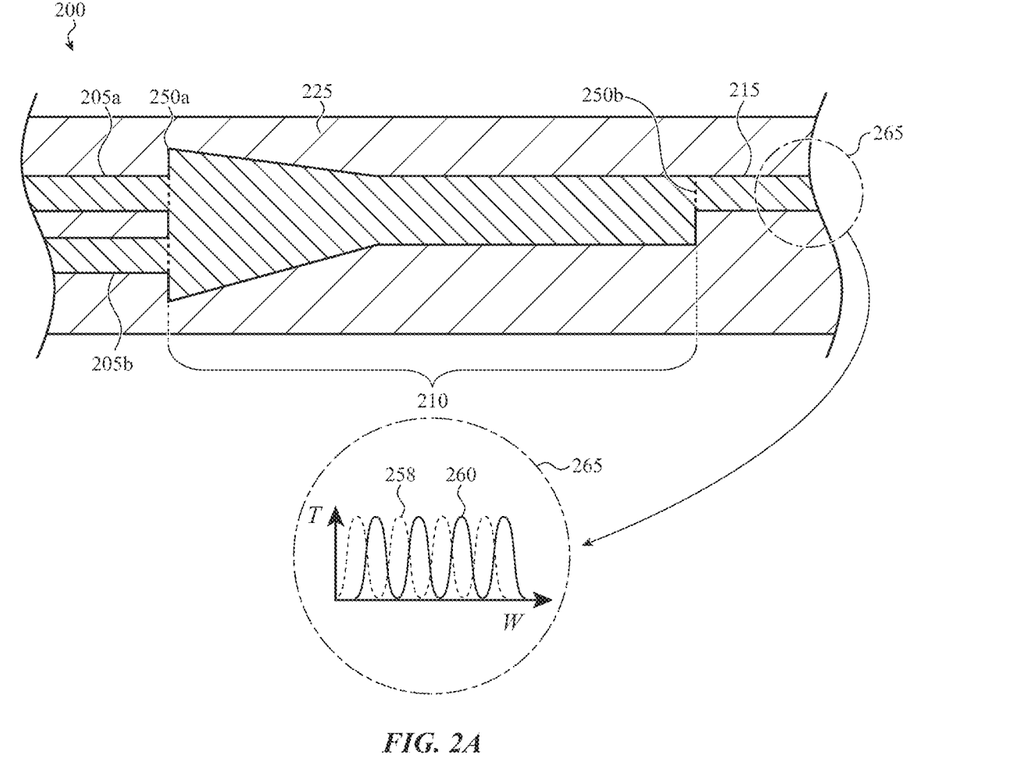
FIG. 2A shows a cross-sectional top view of an example interferometric device that is configured to combine light.

FIG. 2A illustrates a cross-sectional top view (with any layers overlaying the waveguides removed) of an example interferometric device 200 that is positioned within an optical system to combine light. The interferometric device 200 includes a first input waveguide 205a, a second input waveguide 205b, an interferometric waveguide 210, and an output waveguide 215. Similar to the device of FIG. 1, the first and second input waveguides 205a, 205b may receive light of a fundamental mode (from a first and second light source of the optical system (not shown)), and the received light may include a first wavelength of light received at the first input waveguide 205a and the received light may include a second wavelength (different than the first wavelength) at the second input waveguide 205b. A cladding material 225 may surround the first and second input waveguides 205a, 205b, the interferometric waveguide 210, and the output waveguide 215 (although the principles of this application would also apply to instances where air acts as cladding for the waveguide). The first and second input waveguides 205a, 205b connect to the interferometric waveguide 210 at a first end 250a of the interferometric waveguide 210 (to provide optical coupling between the input waveguides and the interferometric waveguide 210). Similarly, the output waveguide 215 connects to the interferometric waveguide 210 at a second end 250b to optically couple the output waveguide to the interferometric waveguide. As used herein, two elements that are "optically coupled" to one another may allow light to pass from one element to the other element. In some embodiments, the output waveguide 215 may be a rib waveguide, but in other embodiments, the output waveguide 215 may be a strip waveguide.

As discussed above with respect to FIG. 1, the interferometric device 200 may be designed specifically to combine a first target wavelength and a second target wavelength. To accomplish this, the interferometric device 200 is tailored to promote transmission of the first target wavelength between the first input waveguide 205a and the output waveguide 215, and is further tailored to promote transmission of the second wavelength between the second input waveguide 205b and the output waveguide 215. As discussed above, the relative positioning between the first input waveguide 205a and the interferometric waveguide 210 will control how much light from the first input waveguide 205a at a given wavelength will reach the output waveguide 215. Similarly, the relative positioning between the second input waveguide 205b and the interferometric waveguide 210 will control how much light from the first input waveguide 205a at a given wavelength will reach the output waveguide 215.

The interface between the first input waveguide 205a and the interferometric waveguide 210 (at first end 250a) will cause some of the light carried by the first input waveguide 205a to be converted from a fundamental mode to a higher order mode. A mode similar conversion occurs at the interface between the second input waveguide 205b and the interferometric waveguide 210 (at first end 250a) for light carried by the second input waveguide 205b. Again, because of the different neff (effective refractive index) between different modes of a given wavelength, the fundamental mode and the higher order mode for each wavelength will interfere along the length of the interferometric waveguide 210. At the second end 250b, the interface between the interferometric waveguide 210 and the output waveguide 215 may convert the higher order mode for each wavelength back to its fundamental mode.

Because there is a wavelength dependency to the interference in the interferometric waveguide, the percentage of light provided by an input waveguide (e.g., first or second input waveguide 205a, 205b) that will reach the output waveguide 215 will also vary as a function of wavelength. For example, FIG. 2A shows a graph 265 depicting the relative transmission of light between the input waveguides and the output waveguide. As shown there, there may be a first transmission profile 258 that represents the percentage of light transmitted (T) between the first input waveguide 205a and the output waveguide 215 as a function of wavelength (W), as well as a second transmission profile 260 that represents the percentage of light transmitted (T) between the second input waveguide 205b and the output waveguide 215 as a function of wavelength (W). These transmission profiles 258, 260 are generally sinusoidal curves that are out of phase.

When the interferometric device 200 is designed to be used in a system where the first and second input waveguides 205a, 205b will receive respective predetermined target wavelengths (e.g., from corresponding light sources that emit these respective wavelengths), the first and second input waveguides 205a, 205b may each be positioned along the first end 250a relative to the interferometric waveguide 210 to respective positions that maximize the light transmission to the output waveguide 215 at its respective target wavelength. In other words, it may be desirable to configure the interferometric device 200 such that the first transmission profile 258 has a peak at a first target wavelength and the second transmission profile 260 has a peak at the second wavelength. In addition to selecting the relative positions of the input waveguides 205a, 205b, altering the dimensions (e.g., length, width, and so forth) of the interferometric waveguide 210 and/or altering the positioning of the output waveguide 215 along the second end 250b of the interferometric waveguide 210 may adjust the transmission profiles 258, 260 (e.g., may adjust the phase and/or frequency of a given transmission profile).

In the example of FIG. 2A, the interferometric waveguide 210 comprises a tapered section at the first end 250a and a straight section at the second end 250b, such that a first end 250a of the interferometric waveguide 210 is wider than a second end 250b of the interferometric waveguide 210. While it is generally desirable to have a thinner interferometric waveguide (e.g., to have a smaller footprint and/or constrain modes in the waveguide), there may be practical constraints on how close the first and second input waveguides 205a and 205b may be to each other (which may in turn limit the ability of the input waveguides to be positioned to maximize the transmission of their respective target wavelengths, especially as the target wavelengths get closer to each other). Accordingly, the tapered section may allow the input waveguides 205a and 205b to be positioned further apart while still maximizing transmission of their respective target wavelengths.

In instances where the interferometric waveguide 210 comprises a tapered section, the width, length, and taper angle of the tapered section may be adjusted to tune the transmission profiles 258, 260, but are preferably selected so as to not excite other higher order modes. For example, the width of the first end 250a of the interferometric waveguide 210 may taper slowly enough that other higher order modes of light may be suppressed. The first end 250a of the interferometric waveguide 210 may taper from the tapered section down to a straight section of the interferometric waveguide 210. Similarly, the straight section may be wide enough to allow the fundamental mode of light as well as the higher order mode of light to propagate through, but is preferably designed such that it does not generate additional higher order modes or otherwise increase optical losses. In some embodiments, the tapered section and the straight section of the interferometric waveguide 210 may be a strip waveguide.

The interferometric waveguide 210 may be used in the system to combine light of a first wavelength with light of a second wavelength (ideally the first and second target wavelengths at which the interferometric waveguide 210 is designed to maximize transmission), and may advantageously use this combined light in a manner as discussed above. For example, when the combined light is used to take a measurement, the first and second wavelengths of light may be close enough to one another that the output light may effectively double the optical power output. While the combined light technically has two different wavelengths, from the perspective of the specific measurement they may be considered equivalent, in that the optical system would yield the same measurement (within acceptable bounds such as discussed above) regardless of whether the output light (for a target output intensity) included only a first wavelength at the target output intensity, only the second wavelength at the target output intensity, or a mix of the first and second wavelengths (that collectively have the target output intensity). Additionally or alternatively, the first and second wavelengths may be separated by a threshold amount such that the optical system may use information from each wavelength to mitigate coherent noise in a measurement.

Figure 2B:
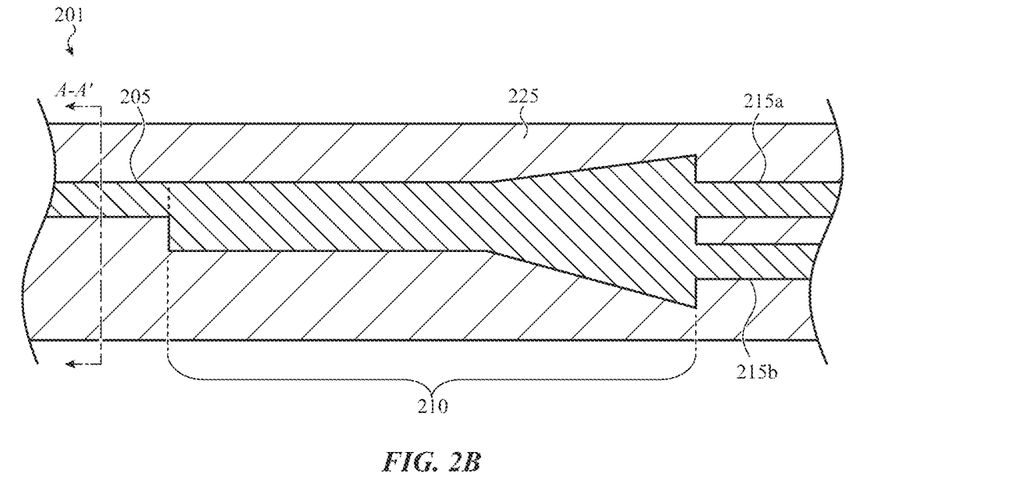
FIG. 2B illustrates a cross-sectional top view of an example interferometric device that is configured to split light.

While the interferometric device 200 is shown in FIG. 2A as being configured to combine light of two wavelengths, it should be appreciated that the interferometric device 200 may instead be used in an optical system to split light having two wavelengths, and may do this by simply using the output waveguide 215 as an input waveguide that receives the combined light. FIG. 2B illustrates a cross-sectional top view (with any layers overlaying the waveguides removed) of an example interferometric device 201 that splits light. The interferometric device 201 may be identical to the interferometric device 200 with the exception that the light is run through the interferometric device 201 in the opposite direction as the interferometric device 200. By the principle of reciprocity, the interferometric device 201 functions as a de-multiplexer and separates the input light having a combined light of a first wavelength and a second wavelength into two different outputs (one having light of the first wavelength and the other having light of the second wavelength).

As shown there, the interferometric device 201 includes an input waveguide 205, an interferometric waveguide 210, a first output waveguide 215a, and a second output waveguide 215b. The first and second output waveguides 215a, 215b may be connected to a tapered section of the interferometric waveguide 210. It should be appreciated that these components may be configured as described above with respect to FIG. 2A (with input waveguide 205, interferometric waveguide 210, first output waveguide 215a, and second output waveguide 215b of FIG. 2B respectively corresponding to output waveguide 215, interferometric waveguide 210, first input waveguide 205a, and second input waveguide 205b of FIG. 2A) to maximize transmission of a first target wavelength between the input waveguide 205 and the first output waveguide 215a and minimize transmission of the first target wavelength between the input waveguide 205 and the second output waveguide 215b. Further, those components may be configured to maximize transmission of a second target wavelength between the input waveguide 205 and the second output waveguide 215b and minimize transmission of the second target wavelength between the input waveguide 205 and the first output waveguide 215a. In this way, light of the first wavelength can be coupled only to the first output waveguide 215a and light of the second wavelength can be coupled only to the second output waveguide 215b.

Because the principle of operation of interferometric device 201 is merely the reverse of that of interferometric device 200, it will only be briefly described here. Specifically, the input waveguide 205 connects to the interferometric waveguide 210 such that a portion of a fundamental mode of light for each wavelength carried by the input waveguide 205 is converted into a higher order mode in the interferometric waveguide 210. The fundamental and higher order modes for each wavelength interfere with each other in the interferometric waveguide, and the higher order mode for each wavelength is converted back to the fundamental mode at the connection between the interferometric waveguide 210 and each output waveguide 215a, 215b. The interferometric device 200 may be configured (as described above with respect to FIG. 2A) such that only light of a first target wavelength is transmitted to the first output waveguide (e.g., there is a valley at the second target wavelength in the transmission profile associated with the first output waveguide) and only light of the second target wavelength is transmitted to the second output waveguide 215b (e.g., there is a valley at the first target wavelength in the transmission profile associated with the second output waveguide). In this way light carrying the first and second target wavelengths is de-multiplexed.

Figure 2C:
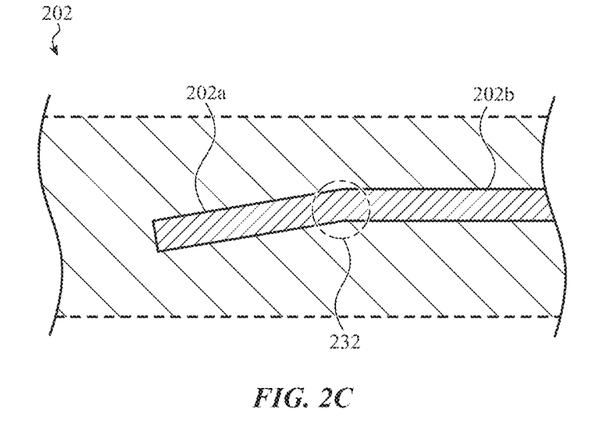
FIGS. 2C-2E show cross-sectional top views of example waveguide junctions suitable for use with the interferometric devices described here.

When an interface between an input or output waveguide and the interferometric waveguide is used to convert light between a fundamental mode and a higher order mode (or vice versa), it may be done in any suitable waveguide junction. For example, FIG. 2C illustrates an example of a waveguide junction 202 with a bend. The waveguide junction 202 includes a first section 202a and a second section 202b with a bend 232 between the first and second sections 202a, 202b. The first section 202a may receive input light that is a fundamental mode of light. The first section 202a and the second section 202b may be any waveguides of the waveguide junction (e.g., an output waveguide and an interferometric waveguide) as needed to accomplish a mode conversion discussed above.

The bend 232 may generate the higher order mode of light from the fundamental mode of light via tilt perturbation. Although the bend 232 is shown as bending in a specific direction between the first and second sections 202a, 202b, the bend 232 may be in any direction as long as a higher order mode may be generated using tilt perturbation. Tilt perturbation may change the boundary conditions of the light by introducing the bend 232 at the waveguide junction 202, thus generating a higher order mode of light from the fundamental mode of light. Although the first and second sections 202a, 202b are depicted with straight sides, in some examples, the waveguide sections may be curved so long as the appropriate width of the waveguides is maintained.

Figure 2D:
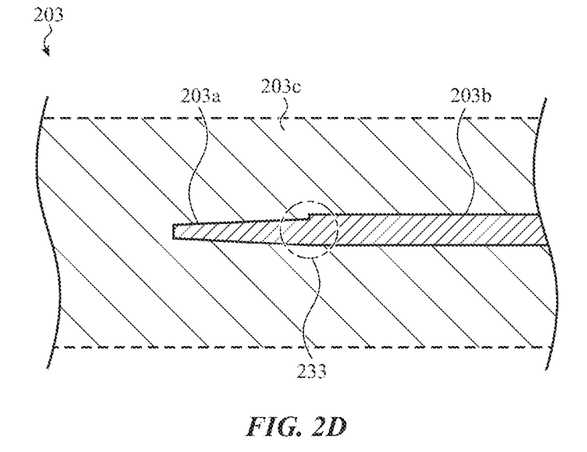

FIG. 2D illustrates an example of another waveguide junction 203. Similar to the waveguide junction 202 of FIG. 2C, the waveguide junction 203 of FIG. 2D may include first and second sections 203a, 203b (which may be any suitable waveguides performing the mode conversion as discussed above). In FIG. 2D, the higher order mode may be generated due to a "kink" 233 between the first and second sections 203a, 203b. The kink 233 may convert the fundamental mode of light to the higher order mode of light. The kink 233 creates a discontinuity in waveguide width between the first and second sections 203a, 203b, which is responsible for the generation of the higher order mode of light. The abrupt change in size between the sections of the waveguide at the kink 233 may cause a higher order mode of light to be generated from the fundamental mode of light received at the input. In the embodiment of FIG. 2D, the higher order mode of light may be TE10 and the fundamental mode of light may be TE00.

Figure 2E:
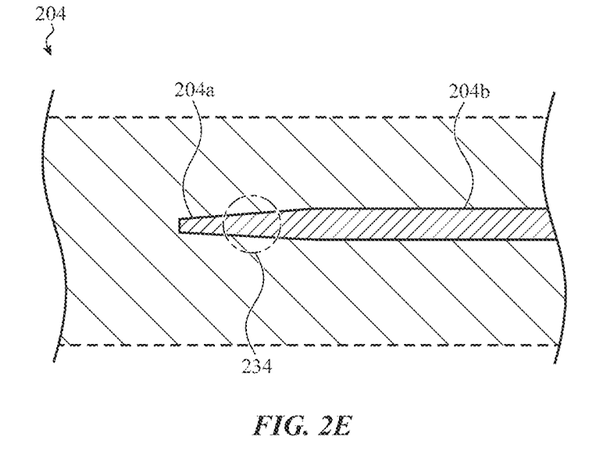

FIG. 2E illustrates an example of another waveguide junction 204. As with FIGS. 2C and 2D, the waveguide junction 204 of FIG. 2E includes a first section 204a and a second section 204b. Differences between the waveguide junction 204 and the waveguide junctions 202, 203 will be described herein.

The first section 204a may receive input which may be a fundamental mode of light that is converted to a higher order mode of light (e.g., three lobe mode of light) at the junction between the first and second sections 204a, 204b. In FIG. 2E, the mode conversion is generated via the taper 234 of the first section 204a. The taper 234 may be fast enough that the fundamental mode of light (e.g., TE00) may be converted at least partially to a higher order mode of light (e.g., TE20). Depending on the rate of taper 234 of the first section 204a, the percentage of light converted to a higher order mode may be controlled. Similarly, in FIGS. 2C and 2D, the bend 232 and the kink 233 may control the percentage of light converted to a higher order mode. It may be understood that any waveguide junction embodiments of FIGS. 2C, 2D, and 2E (or combinations thereof) may create the desired mode changes discussed above in FIGS. 2A and 2B.

Figure 3A:
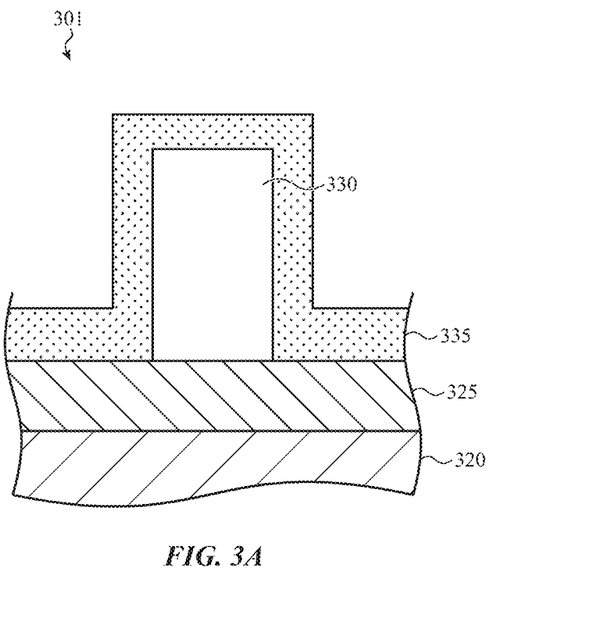
FIGS. 3A and 3B show cross-sectional side views of one example of a waveguide taken along line A-A' of FIG. 2B.
Figure 3B:
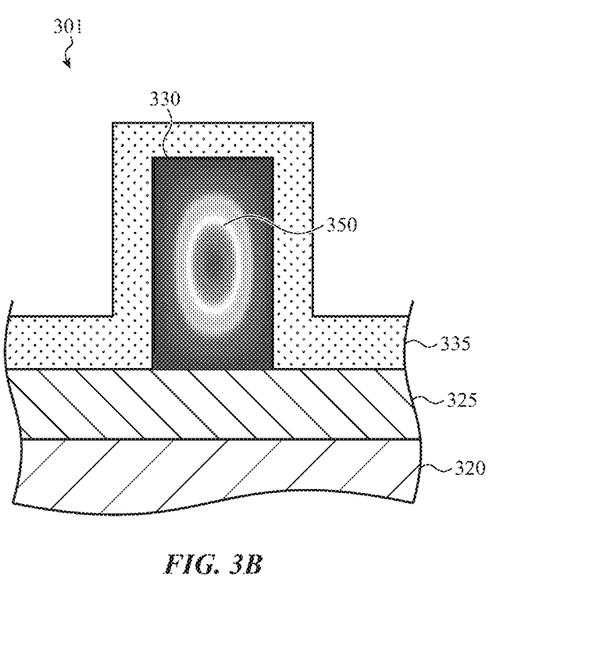

FIG. 3A illustrates a cross-sectional side view of one example of a waveguide 301 taken along line A-A' of FIG. 2B with no light propagating through the interferometric device 201. The waveguide 301 illustrates a generic structure through which light may propagate and is not drawn to scale. The waveguide 301 includes a silicon substrate 320, a first cladding layer 325, a propagation layer 330, and a second cladding layer 335. As shown in FIG. 3B, the first cladding layer 325 is disposed on the silicon substrate 320, the propagation layer 330 (which may be a propagation region) is disposed on the first cladding layer 325, and the second cladding layer 335 is disposed on the propagation layer 330. Although FIG. 3A depicts the first cladding layer 325 and the second cladding layer 335, there may be cladding layers surrounding the sides of the waveguide as well as having cladding layers above and below the cladding layers. In this embodiment, light emitted by a light source propagates into or out of the plane of FIG. 3A and specifically through the propagation region 330 of the waveguide 301, which is the propagation layer 330. In some embodiments, the first cladding layer 325 and the second cladding layer 335 may be formed from an oxide, such as silicon dioxide or other appropriate dielectric materials.

FIG. 3B illustrates a cross-section side view of one example of a waveguide 301 taken along line A-A' of FIG. 2B and illustrates a cross-section of the waveguide 201 shown in which light with a single mode 350 is propagating therethrough. As previously discussed in FIG. 2B, the input waveguide 205, the interferometric waveguide 210, and the output waveguide 215 all may support a single mode of light 350, such as a fundamental mode of light (e.g., TE00). The light having the fundamental mode may propagate through the input waveguide 205 and to the interferometric waveguide 210. Although the single mode of light 350 is described above as propagating through the input waveguide 205 and the interferometric waveguide 210, the interferometric waveguide 210 may support more than the fundamental mode of light. Additionally, the supported modes of light in the interferometric waveguide 210 may be collapsed into a single mode of light 350 in the output waveguide 215, which may output the fundamental mode of light 350 shown in this figure, FIG. 3B.

Figure 4A:
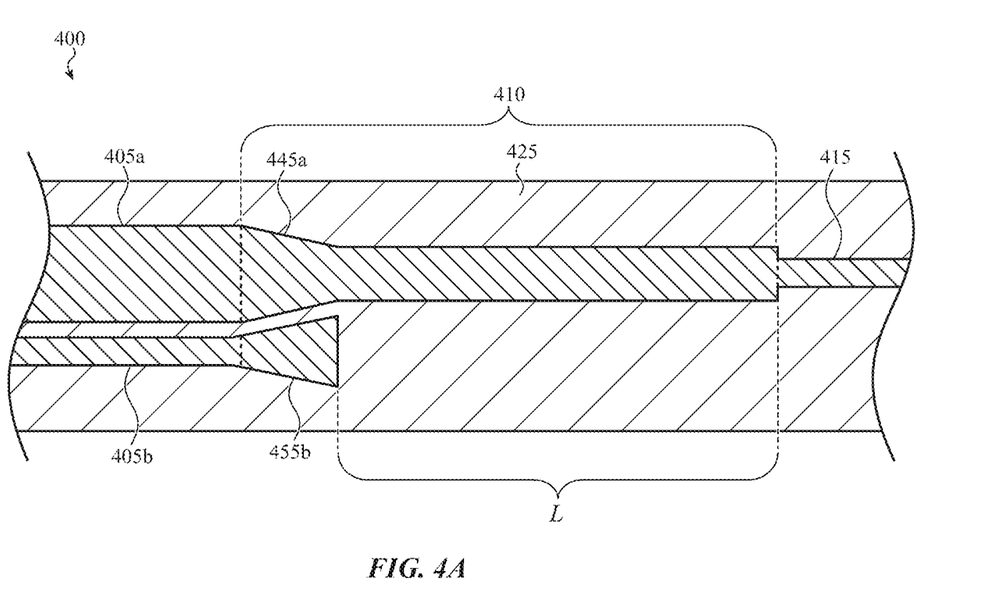
FIG. 4A shows a cross-sectional top view of an example interferometric device that may be used in an optical system to split or combine light.
Figure 4B:
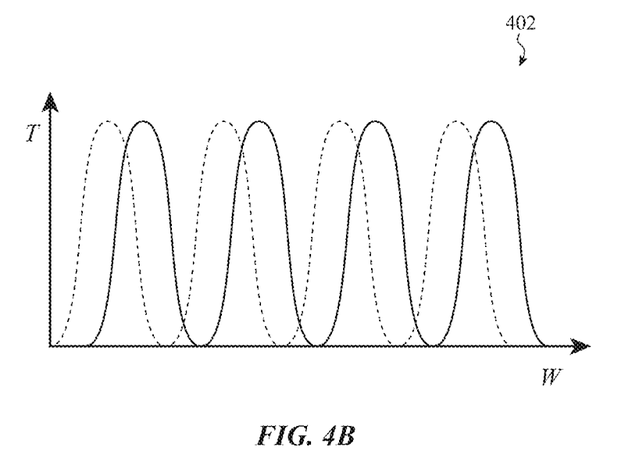
FIG. 4B illustrates an example transmission profile between the inputs and the output of the interferometric device of FIG. 4A.

FIG. 4A illustrates a cross-sectional top view (with any layers overlaying the waveguides removed) of an example interferometric device 400 that may be used in an optical system to split or combine light. The interferometric device 400 will be described below as being used in an optical system to combine light (e.g., for one or more of the purposes described above), though it should be appreciated that the interferometric device 400 may instead be used to split light by a reciprocal operation.

As shown in FIG. 4A, the interferometric device 400 may comprise a first input waveguide 405a, a second input waveguide 405b, an interferometric waveguide section 410 comprising a first interferometric waveguide 445a and a second interferometric waveguide 445b, and an output waveguide 415. A cladding material 425 may surround the individual waveguides of the interferometric device 400 such as discussed above.

The interferometric waveguide section 410 may have a first sinusoidal transmission profile between the first input waveguide 405a and the output waveguide 415 and a second sinusoidal transmission profile between the first input waveguide 405a and the output waveguide 415. These transmission profiles are collectively shown as 402 in FIG. 4B. As with the interferometric device 200 described above with respect to FIG. 2A, the interferometric waveguide section 410 can be configured to maximize transmission of a first target wavelength from the first input waveguide 405a to the output waveguide 415 and to maximize transmission of a second target wavelength from the second input waveguide 405b to the output waveguide 415, which may facilitate multiplexing the first and second target wavelengths.

In order to facilitate light transmission between the input waveguides 405a, 405b and the output waveguide 415, the first interferometric waveguide 445a may comprise a tapered section (a first tapered section of the interferometric waveguide section 410) and a straight section while the second interferometric waveguide 445b comprises a tapered section (a second tapered section of the interferometric waveguide section 410). The first tapered section is connected at a first end to the first input waveguide 405a and is connected at a second end to the straight section of the first interferometric waveguide 445a. The first input waveguide 405a may be wider than the straight section of the first interferometric waveguide 445a such that the first tapered section narrows from its first end to its second end. The second tapered section is connected at a first end to the second input waveguide 405b and may terminate at a second end of the second tapered section. The width of the second tapered section may widen from the first end to the second end, such that the first tapered section narrows as the second tapered section widens. The first tapered section and the second tapered section may be positioned in sufficient proximity to each other (e.g., separated by a predetermined gap) to allow optical coupling therebetween.

Collectively, the first tapered section and the second tapered section are configured to convert a portion of input light from each input waveguide 405a, 405b from a fundamental mode into a higher order mode and to pass both the fundamental mode and higher order mode of each input light to the straight section of the first interferometric waveguide 445a. For example, the first input waveguide 405a may receive light of a first wavelength at a fundamental mode. When the first wavelength of light is passed to the first tapered section of the interferometric waveguide section 410, the first and second tapered sections will collectively act to convert a portion of the first wavelength of light into a higher order mode, and to pass the two modes of light to the straight section of the first interferometric waveguide 445a.

Similarly, the second input waveguide 405b may receive light of a second wavelength at a fundamental mode. When the first wavelength of light is passed to the first tapered section of the interferometric waveguide section 410, the first and second tapered sections will collectively act to convert a portion of the second wavelength of light into a higher order mode, and to pass the two modes of light to the straight section of the first interferometric waveguide 445a. In this manner, the straight section of the first interferometric waveguide 445a will receive light at both a fundamental and higher order mode for each wavelength. The different modes for a given wavelength will interfere with each other in the straight section (it should be appreciated that some interference between the modes may also occur in the tapered sections), and the higher order mode for each wavelength may be converted to back to the fundamental mode.

The transmission profile between each input waveguide 405a, 405b and the output waveguide may be determined at least in part by the dimensions and relative placement of the output waveguide 415, the first interferometric waveguide 445a, the second interferometric waveguide 445a, and the first and second input waveguides 405a, 405b. As with the interferometric device 200 described above with respect to FIG. 2A, these components may be selected to set the frequency and phase of the transmission such that the first transmission profile 258 has a peak at a first target wavelength and the second transmission profile 260 has a peak at the second wavelength.

As mentioned above, the interferometric device 400 may be used in an optical system to de-multiplex light instead of multiplexing light. Specifically, the output waveguide 415 may instead be used as an input waveguide, and the optical system may be configured to provide light to the input waveguide (output waveguide 415 in FIG. 4A) having both a first wavelength and a second wavelength of light. As the light passes into the interferometric waveguide section 410, a portion of the fundamental mode of each wavelength may be converted to a higher order mode. The fundamental and higher order modes for each wavelength will interfere with each other within the interferometric waveguide section 410, and will be converted back into a fundamental mode in each of the first and second output waveguides (i.e., first input waveguide 405a and second input waveguide 405b in FIG. 4A).

The relative amount of each wavelength that ends up in each output waveguide is dependent on the transmission profiles between the input waveguide and each output waveguide. Specifically, the transmission profiles may be configured (by adjusting the relative position and dimensions of the various waveguides of the interferometric device) such that the first transmission profile has a peak at the first wavelength and a valley at the second wavelength, while the second transmission profile has a valley at the first wavelength and a valley at the second wavelength, such that only the first wavelength is coupled into the first output waveguide. As a result, the input wavelengths may be de-multiplexed.

Figure 5A:
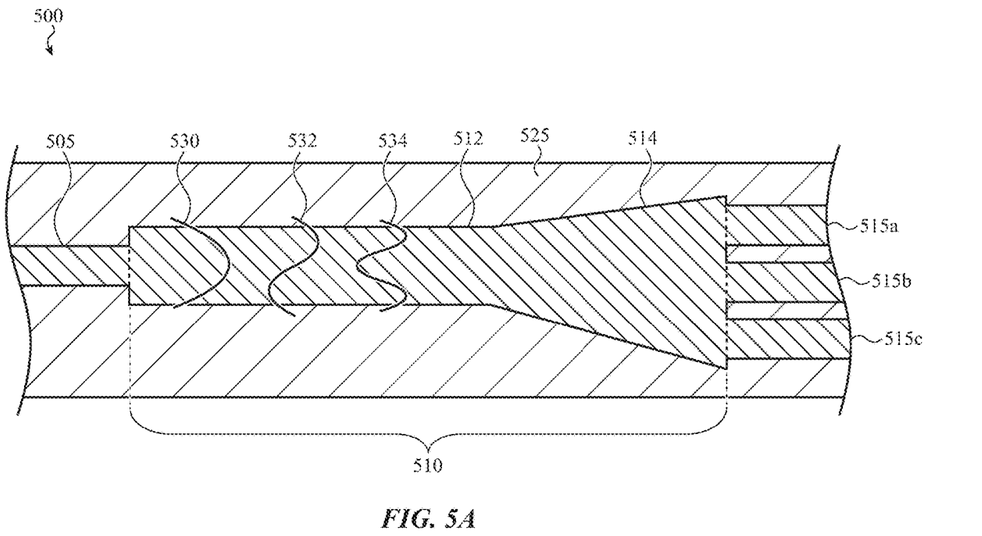
FIG. 5A shows a cross-sectional top view of an example interferometric device that may be used to split or combine three wavelengths of light.

As mentioned above, in some instances the interferometric devices described here may be used to split or combine three or more wavelengths of light. FIG. 5A illustrates a cross-sectional top view (with any layers overlaying the waveguides removed) of an example interferometric device 500 that may be used in an optical system to split or combine light. The interferometric device 500 will be described below as being used in an optical system to split light (e.g., for one or more of the purposes described above), though it should be appreciated that the interferometric device 500 may instead be used to combine light by a reciprocal operation.

As shown in FIG. 5A, the interferometric device 500 includes an input waveguide 505, an interferometric waveguide 510, a first output waveguide 515a, a second output waveguide 515b, and a third output waveguide 515c. A cladding material 525 may surround the input waveguide 505, the interferometric waveguide 510, and the first, second, and third output waveguides 515a-515c to provide optical confinement thereto. The interferometric waveguide 510 includes a straight section 512 and a tapered section 514, though it should be appreciated that variations of the interferometric waveguide 510 may include other combinations of straight and/or tapered sections as desired. The input waveguide 505 is connected to the straight section 512 of the interferometric waveguide 510, and the first, second, and third output waveguides 515a-515c are connected to tapered section 514 of the interferometric waveguide 510. As discussed with respect to FIGS. 2A and 2B, the tapered section 514 increases the width of the interferometric waveguide 510 to facilitate placement of the output waveguides 515a-515c while still maximizing transmission of the light to these outputs. The width, length and taper angle of the tapered section may be adjusted to tune the transmission to the output waveguides 515a-515c, but are preferably selected so as to not excite other higher order modes.

The junction between the input waveguide 505 and the interferometric waveguide 510 is configured to generate multiple higher order modes. Specifically, the interferometric waveguide 515 may receive input light at a given wavelength and with a fundamental mode 530 (e.g., TE00) and convert both a first portion of the fundamental mode of light to a first higher order mode of light 532 (e.g., TE01) and a second portion of the fundamental mode of light to a second higher order mode of light 534 (e.g., TE02). Accordingly, the interferometric waveguide 510 carries each of the fundamental mode of light 530, the first higher order mode of light 532, and the second higher order mode of light 534.

Figure 5B:
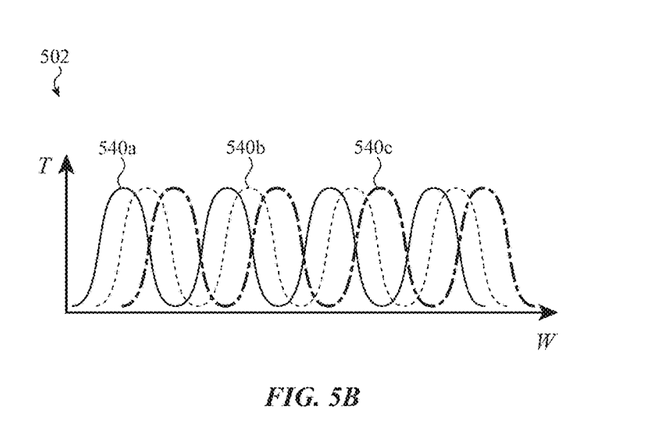
FIG. 5B illustrates an example transmission profile between the inputs and the output of the interferometric device of FIG. 5A.

The different modes of light for each wavelength introduced into the interferometric waveguide 510 will interfere along the length of the interferometric waveguide 510. The interface between the interferometric waveguide 510 and the output waveguides 515a-515c may convert the higher order modes for each wavelength back to its fundamental mode. Because of the wavelength dependency of this interference, the percentage of light provided by the input waveguide 505 that will reach each of the output waveguides 515a-515c will also vary as a function of wavelength. FIG. 5B shows a graph 502 depicting the relative percentage of light transmitted (T) between the input waveguide 505 and the output waveguides as a function of wavelength ("W"). As shown there, a first transmission profile 540a represents the percentage of light transmitted between the input waveguide 505 and the first output waveguide 515a, a second transmission profile 540b represents the percentage of light transmitted between the input waveguide 505 and the second output waveguide 515b, and a third transmission profile 540c represents the percentage of light transmitted between the input waveguide 505 and the third output waveguide 515c. These transmission profiles are generally sinusoidal curves that are out of phase.

The configuration of the interferometric waveguide 510 and the relative placement of the input waveguide 505 and the output waveguides 515a-515c may be selected to maximize transmission of a first wavelength to the first output waveguide 515a, to maximize transmission of a second wavelength to the second output waveguide 515b, and to maximize transmission of a third wavelength to the third output waveguide 515c. In this way, light of first, second, and third wavelengths can be coupled only to the first output waveguide 515a, second output waveguide 515b, and third output waveguide 515c respectively. As a result, if the interferometric device 500 is used in an optical system that provides light having the first, second, and third wavelengths (or a subset thereof), this is de-multiplexed into the corresponding output waveguides.

The interferometric device 500 may also be used to combine multiple wavelengths of light. For example, the interferometric device 500 may be used in an optical system where a first light source (not shown) is optically connected to the first output waveguide 515a, a second light source (not shown) is optically connected to the second output waveguide 515b, and a third light source (not shown) is optically connected to the third output waveguide 515c. In these instances, the first, second, and third output waveguides 515a-515c instead act as input waveguides to receive light from the first, second, and third light sources, respectively. The principle of operation is the reverse of the splitting operation described above, such that the transmission from each of these waveguides 515a-515c (and its corresponding wavelength) is maximized at input waveguide 505 (which acts as an output waveguide during a combining operation). This results in all three wavelengths being combined in waveguide 505.

Representative applications of methods and apparatuses according to the present disclosure are described in this section. These examples are being provided solely to add context and aid in the understanding of the described examples. It will thus be apparent to one skilled in the art that the described examples may be practiced without some or all of the specific details. Other applications are possible, such that the following examples should not be taken as limiting.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. An interferometric device for combining light from a first light source, a second light source, and a third light source, comprising:
   a first input waveguide configured to receive input light of a first wavelength with a fundamental mode from the first light source;
   a second input waveguide configured to receive input light of a second wavelength with the fundamental mode from the second light source, the second input waveguide physically separated from the first input waveguide by a gap;
   a third input waveguide configured to receive input light of a third wavelength with the fundamental mode from the third light source;
   an interferometric waveguide configured to combine the light from the first input waveguide, the second input waveguide, and the third input waveguide; and
   an output waveguide physically connected to the interferometric waveguide, wherein;
   the interferometric waveguide comprises:
      a tapered section; and
      a straight section abutting the tapered section;
      the first input waveguide, the second input waveguide, and the third input waveguide are connected to the tapered section;
      the tapered section is configured to generate, for the input light of each of the first, second, and third wavelengths, a first higher order mode from a first portion of the fundamental mode and a second higher order mode from a second portion of the fundamental mode, and combines the input light from the first light source, the second light source, and the third light source; and
   an interface between the interferometric waveguide and the output waveguide is configured to convert, for each of the first, second, and third wavelengths, the first higher order mode and the second higher order mode to the fundamental mode.

2. The interferometric device of claim 1, wherein the first and second input waveguides are parallel leading up to the tapered section of the interferometric waveguide.

3. The interferometric device of claim 1, wherein the first and second input waveguides are straight across a length of the first and second input waveguides.

4. The interferometric device of claim 1, wherein:
   the output waveguide comprises an output central axis;
   the interferometric waveguide comprises an interferometric central axis; and
   the output central axis is offset from the interferometric central axis.

5. The interferometric device of claim 1, wherein:
   the output waveguide comprises a first width;
   the interferometric waveguide comprises a second width; and
   the second width is wider than the first width.

6. The interferometric device of claim 1, wherein an angle between the first input waveguide and the interferometric waveguide and the second input waveguide and the interferometric waveguide is the same.

7. A multiplexing device, comprising:
   a first input waveguide configured to receive a first wavelength of a single mode of light;
   a second input waveguide configured to receive a second wavelength of the single mode of light,
   an interferometric waveguide section, comprising:
      a first interferometric waveguide connected to the first input waveguide and having a first tapered section and a straight segment; and
      a second interferometric waveguide connected to the second input waveguide and having a second tapered section, wherein the second tapered section is optically coupled to the first tapered section; and
   an output waveguide connected to the straight section of the first interferometric waveguide, wherein:
   the first tapered section and the second tapered section are configured to convert a portion of the single mode of light into a higher order mode for each of the first and second wavelengths; and
   the output waveguide is configured to:
      convert the higher order mode of light of each of the first and second wavelengths received from the interferometric waveguide to the single mode of output light; and
      output a combined light of the first and second wavelengths having the single mode of light.

8. The multiplexing device of claim 7, wherein:
   the second tapered section tapers from a first width to a second width;
   the second width is wider than the first width; and
   the first width of the second tapered section is a same width as the second input waveguide.

9. The multiplexing device of claim 7, wherein a straight section of the first input waveguide receives the input single mode of light.

10. The multiplexing device of claim 9, wherein:
a first end of a first tapered section of the first interferometric waveguide is abutted to the first input waveguide,
the first end of the first tapered section has a first width;
a second end of the first tapered section has a second width and is abutted to the straight section of the first interferometric waveguide; and
the second width of the first tapered section is narrower than the first width of the first tapered section.

11. The multiplexing device of claim 7, wherein the first input waveguide and the second input waveguide are rib waveguides.

12. The multiplexing device of claim 7, wherein the first interferometric waveguide is a strip waveguide.

\* \* \* \* \*